(12) United States Patent
Saiz

(10) Patent No.: US 6,498,402 B2
(45) Date of Patent: Dec. 24, 2002

(54) WING ENERGY CATCHMENT DEVICE

(76) Inventor: Manuel Munoz Saiz, San Emilio 16, 1, 3, Madrid 20817 (ES)

( * ) Notice: Subject to any disclaimer, the term of this patent is extended or adjusted under 35 U.S.C. 154(b) by 39 days.

(21) Appl. No.: 09/858,176

(22) Filed: May 15, 2001

(65) Prior Publication Data

US 2002/0056995 A1 May 16, 2002

(30) Foreign Application Priority Data

Nov. 16, 2000 (ES) .......................................... 20002749

(51) Int. Cl.⁷ ................................................ F03D 5/00
(52) U.S. Cl. .......................................... 290/55; 290/54
(58) Field of Search .............................. 290/43, 44, 54, 290/55; 416/5, 6, 7, 8

(56) References Cited

U.S. PATENT DOCUMENTS

| | | | | |
|---|---|---|---|---|
| 4,124,182 A | * | 11/1978 | Loeb | 244/153 R |
| 4,756,666 A | * | 7/1988 | Labrador | 415/5 |
| 4,859,146 A | * | 8/1989 | Labrador | 415/5 |
| 6,072,245 A | * | 6/2000 | Ockels | 290/44 |

FOREIGN PATENT DOCUMENTS

DE 3303547 * 9/1984 ............. F03D/5/02

* cited by examiner

Primary Examiner—Nicholas Ponomarenko
(74) Attorney, Agent, or Firm—Robert M. Schwartz

(57) ABSTRACT

Wind energy catchment device that consists of loops of closed circuits of cables or ropes which go through a succession of parachutes in series, that rotates by means of pulleys among columns, pylons or shafts secured to rigid supports fixed to the ground, the cables go through the parachutes by their asymmetry axis, the cables are secured to the fabric of the parachute by their center zone, having the parachute a hole or holes around said cable, the ends of the strings of the parachute tie or join its periphery with a common point of the cable.

13 Claims, 4 Drawing Sheets

WING ENERGY CATCHMENT DEVICE

CROSS REFERENCE TO RELATED APPLICATIONS

This patent claims the priority date of Spanish Patent P200002749 filed on Nov. 16, 2000. The basis for priority in this case is the Paris Convention for the Protection of Industrial Property (613 O.G. 23. 53 Stat 1748) The Spanish patent application was filed in the Official Patent and Trademark Office of Spain.

BACKGROUND OF THE INVENTION

1. Field of the Invention

This invention refers to a device for capturing wind energy, using multiple parachutes that are reoriented cyclically as the device turns, and refers to wind catchment units that principally generate electrical power and are of the largescale type, using wind power in a centralized and commercial form.

2. State of the Prior Art

Current energy systems pollute if they use fossil feels and are extremely radioactive if nuclear fuels are used. On the other hand, existing wind catchment systems require advanced technology, high costs, location on elevated sites and high winds to ensure high performance, and depend on wind conditions that are difficult to obtain, such as 25–50 km/h, still less on a constant heading. Such sites are not easily found. These facilities are difficult to control, complex, costly or impractical, and the energy proves more expensive than with conventional systems, while killing birds and generating a high environmental impact. They require systems for direction into the wind, and high technology.

DESCRIPTION OF THE INVENTION

The wind energy catchment in the invention consists of loops or closed circuits of cables or ropes which go through a succession of parachutes in series, that rotates by means of pulleys among columns, pylons or shafts, fixed or rotary and secured to rigid supports fixed to the ground, The cables go through the parachutes by their asymmetry axis, the cables are secured to the fabric of the parachute by its center zone, having the parachute a hole or how around said cable, fastening the fabric by its center zone allows that when the wind direction is reversed, the parachute or parachutes are folded offering the lowest resistance to the wind. The ends of the strings of the parachute tie or join its periphery with a common point of the cable.

Each upper end of the fixed column or pylons can have a pulley whose rotary shafts are horizontal.

Several groups of cables and parachutes which are parallel among themselves can be used around the shafts.

The top end of the shafts can be secured to the ground by cables or stays.

During rotation, the wind catchment device is divided in relation to the incident wind into two halves: on one, the parachutes offer maximum resistance, while this is minimal on the other half, thus causing and providing a high rotation torque, this is done cyclically on each parachute as it rotates, enhancing tie device's performance.

The mechanical power obtain is transformed into hydraulic or electrical power by means of a hydraulic pump and an alternator or directly into electrical by means of a generator and an electrical inverter.

One or both of the cords are of reduced cross-section, which will break under excessively strong winds or gusts.

Advantages. This catching device, which eliminates many of the problems described above, provides a potent, cost-effective energy source independently of optimal wind conditions, it does not require optional siting, nor does it have to be placed on very high ground. It does not require highly specialised personnel or techniques, whether constructed on a large or small scale. It is safe. It operates with winds from all directions. It is easy and cheap to repair, fit and dismantle. It is easily transported. It does not require a large structure. It can be made easily and economically. It self-protects against excessive wind. Economical power generators can be used. It captures a large amount of energy. It does not require a large part of the energy to run its own mechanisms. The parachutes are very cheap as is their replacement. It is generally installed on the ground. Per-KW cost is very low. High performance. The parachutes are not noisy. It provides the largest existing catchment surface. Expensive steering mechanisms are not required. By using low-intensity winds, it has a longer annual period of use and allows for a larger number of usable zones. It is simpler and more economical. The generator and mechanisms are at the bottom. The complex steering system is not required. It can be used with winds from any direction. It does not kill birds or pollute. The device allows greater catchment area and so the greatest power of all the devices or catchment systems known and possible, thanks to the absence of large moving parts except for cables, which can be made to extremely large dimensions.

DETAILED DESCRIPTION OF THE INVENTION

Figure 1:
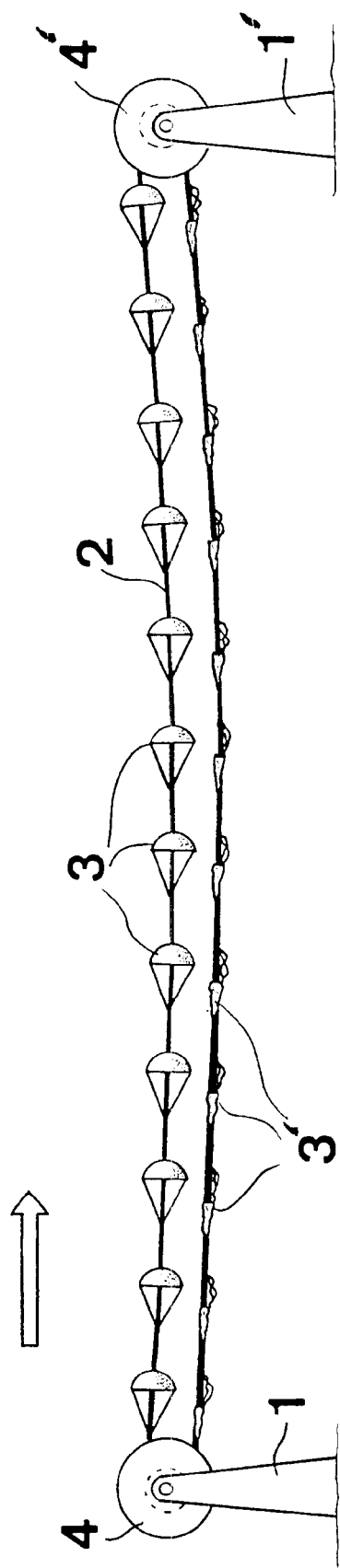
FIGS. 1 and 2 show partial side schematic views of the wind energy catchment of the invention.

FIG. 1 shows the columns or pylons (1 and 1), the cable (2), the parachutes open or unfolded (3) and folded (3') and pulleys (4 and 4'). Cables and pulleys rotate around horizontal shafts. It is used with winds blowing mainly from an only direction.

Figure 2:
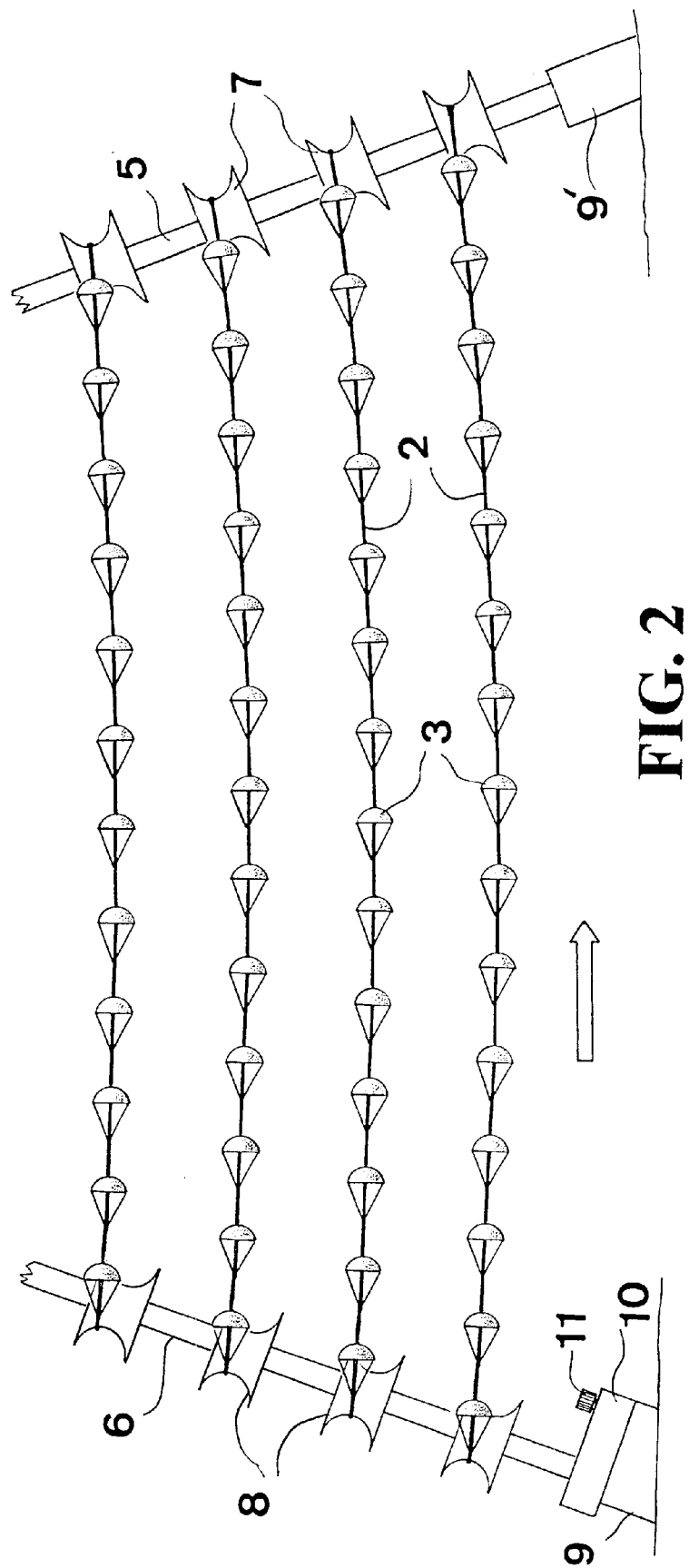

FIG. 2 shows the cables (2), the parachutes open or unfolded (3), the fixed shaft (5) covering or rotating around them the pulleys (7), rotating shaft (6) with their fixed pulleys (8), the support (9), the rpm increaser (10) and the gear (11).

Figure 3:
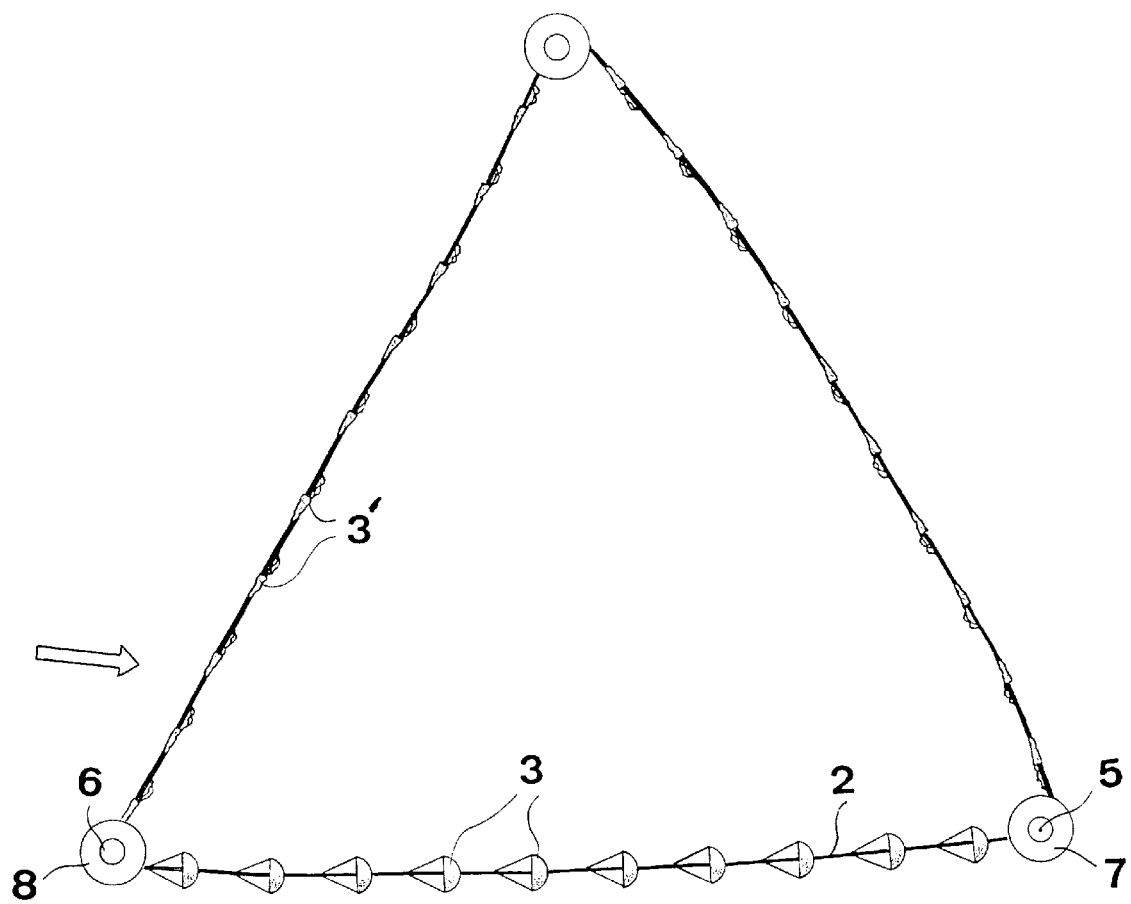
FIG. 3 shows a top schematic view of a variant of the wind catchment device.

FIG. 3 shows the cables (2), the parachutes open or unfolded (3) and folded (3') the fixed shaft (5) rotating around them the pulleys (7), the rotating shaft (6) with their fixed pulleys (8), the support (9). It is to catch winds blowing from all directions.

Figure 4:
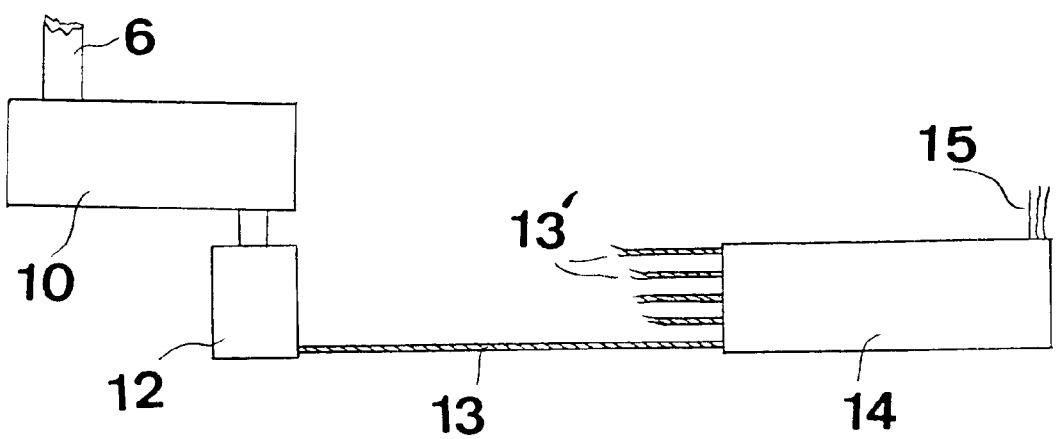
FIGS. 4 and 5 show schematic views of different systems to transform its energy.

FIG. 4 shows the shaft (6), the rpm increaser (10), the direct current generator (12), the current wire (13), the current wire from other catching devices (13'), the current inverter (14) and the output alternate current wires (15).

Figure 5:
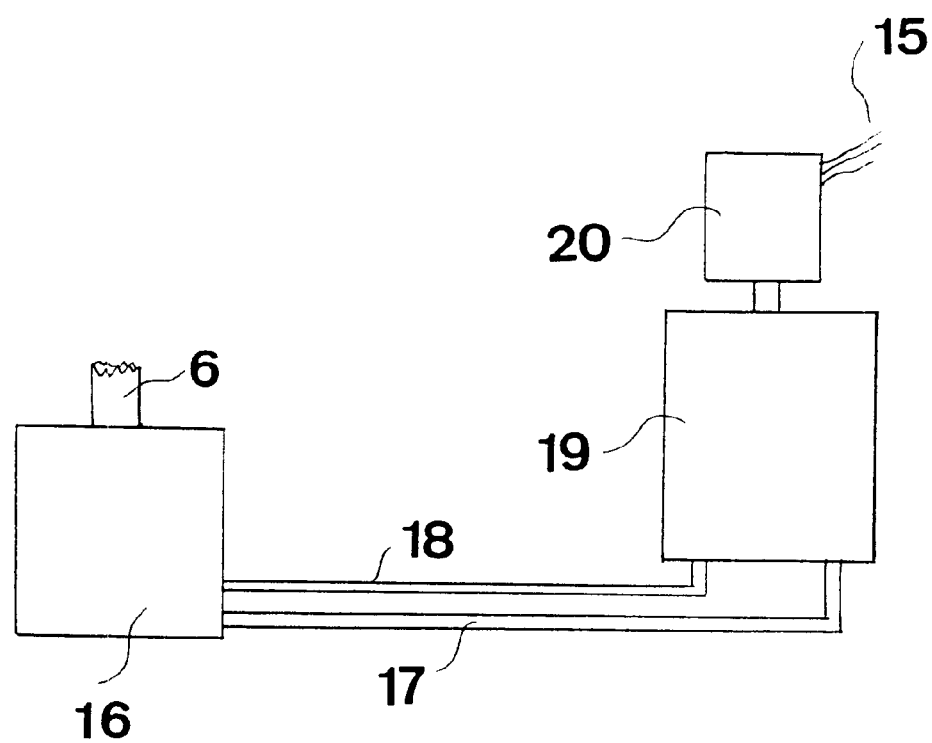

FIG. 5 shows the shaft (6), the hydraulic pump (16), the hydraulic pressure duct (17), the return duct (18), the hydraulic engine (19), the alternate current generator (20) and the output alternate current wires (15).

What is claimed is:

1. Wind energy catchment device that consists of loops or closed circuits of cables or ropes which go through a succession of parachutes in series, that rotates by means of pulleys among columns, pylons or shafts secured to rigid supports fixed to the ground, the cables go through the parachutes by their asymmetry axis, the cables are secured to the fabric of the parachute by their centre zone, having the parachute a hole or holes around said cable, the ends of the strings of the parachute tie or join its periphery with a common point of the cable.

2. Wind energy catchment device according to claim 1, wherein the columns, shafts or pylons are vertical.

3. Wind energy catchment device according to claim 1, wherein the columns, shafts or pylons are slightly inclined.

4. Wind energy catchment device according to claim 1, wherein the shafts are fixed.

5. Wind energy catchment device according to claim 1, wherein the shafts are rotary.

6. Wind energy catchment device according to claim 1, having on each upper end of the fixed column or pylons, a pulley whose rotary shafts on each pylon end are horizontal.

7. Wind energy catchment device according to claim 1, wherein the pulleys are around or covering the shafts.

8. Wind energy catchment device according to claim 1, wherein several groups of cables and parachutes are parallel among themselves and are used around the shafts.

9. Wind energy catchment device according to claim 1, wherein the top ends of the shafts are secured to the ground by cables or stays.

10. Wind energy catchment device according to claim 1, wherein the mechanical power obtain is transformed into hydraulic or electrical power by means of a hydraulic pump and an alternator.

11. Wind energy catchment device according to claim 1, wherein the mechanical power obtain is transformed into electrical power by means of a generator and an electrical inverter.

12. Wind energy catchment device according to claim 1, wherein the cable and parachutes are assembled between the ends of two vertical columns or pylons.

13. Wind energy catchment device according to claim 1, wherein the cable and parachutes are settled around two or more rotary vertical or slightly inclined shafts.

* * * * *